(12) United States Patent
Matsuda

(10) Patent No.: US 7,046,424 B2
(45) Date of Patent: May 16, 2006

(54) ELECTROPHORETIC DISPLAY DEVICE

(75) Inventor: Yojiro Matsuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 10/808,821

(22) Filed: Mar. 25, 2004

(65) Prior Publication Data

US 2004/0252363 A1    Dec. 16, 2004

(30) Foreign Application Priority Data

Mar. 25, 2003    (JP)    ............................. 2003-083715

(51) Int. Cl.
*G02B 26/00*    (2006.01)

(52) U.S. Cl. ...................................... 359/296; 345/107

(58) Field of Classification Search ................ 359/296; 430/32, 34, 38; 345/107, 105

See application file for complete search history.

(56) References Cited

U.S. PATENT DOCUMENTS

| 3,612,758 A | 10/1971 | Evans et al. |
| 6,597,334 B1 * | 7/2003 | Nakamura ..................... 345/68 |
| 6,614,412 B1 * | 9/2003 | Hirano et al. ................. 345/60 |
| 6,750,844 B1 * | 6/2004 | Nakanishi ..................... 345/107 |

FOREIGN PATENT DOCUMENTS

| JP | 11-202804 | 7/1999 |
| JP | 2002-040489 | 2/2002 |
| JP | 2002-287174 | 10/2002 |

* cited by examiner

*Primary Examiner*—Hung Xuan Dang
*Assistant Examiner*—Tuyen Tra
(74) *Attorney, Agent, or Firm*—Morgan & Finnegan, L.L.P.

(57) ABSTRACT

A display device which comprises charged particles located on a substrate and a device of moving the charged particles parallel to the substrate, and whose display states to be recognized visually from above the substrate are determined by positions of the charged particles within the substrate, wherein the substrate contains a fluorescent material or a luminous material.

2 Claims, 2 Drawing Sheets

ELECTROPHORETIC DISPLAY DEVICE

BACKGROUND OF THE INVENTION

1. Field of the Invention

The present invention relates to an electrophoretic display device that displays using the migration of charged particles.

2. Related Background Art

With the remarkable progress in digital technology, the amount of information a person can handle has been increasing rapidly. In connection with this, displays as an information output means are actively developed aiming at a display of high usability such as high definition, low power consumption, light weight and thin body. In recent years, large expectations are laid on the "easy to read" reflective display having the same display quality as the printed matters, which is a technology indispensable for the next-generation products such as electronic paper and electronic books. A candidate of such a display is an electrophoretic display device proposed by U.S. Pat. No. 3,612,758 to Harold D. Lees et al.

This electrophoretic display device comprises a pair of substrates and a mixture of colored charged particles and an insulating liquid containing a coloring agent held between the substrates, to form an image with the color contrast between the coloring charged particles and the colored insulating liquid.

Japanese Unexamined Patent Publication No. H11-202804 proposes an electrophoretic display device which does not require coloration of the insulating liquid and forms an image with the color contrast between the colored electrophoretic particles distributed in a transparent fluid and a colored layer or reflective layer located on a substrate. This display uses the difference of appearance when the particles are in a position to cover the colored layer and when they are in a position to reveal the colored layer. In order to move the charged particles laterally, one electrode is located on one substrate, and the other electrode is located under the colored layer. In many cases, an electrode surface under the colored layer also serves as a light reflector to reflect the light that enters from above the substrate to the upward direction.

Such an electrophoretic display device uses a transparent liquid without mixing a coloring agent such as a dyestuff into the insulating liquid. This has benefits such as elongation of display life and prevention of contrast deterioration.

For an easy-to-read reflective display device having a display quality equivalent to printed matters, brighter display quality is required. Conventional reflective type electrophoretic display devices have a paper-like readablility, but become invisible in a pitch-black place with no outside light. In particular, if the surrounding environment changes from a bright environment to a very dark environment temporarily, for example, when a user moves from outdoor to indoor, the user cannot visually recognize the display in use, which is a disadvantage in practical use.

In order to solve such a problem, Japanese Unexamined Patent Publication No. 2002-040489 proposes to mix a fluorescent material into the insulating liquid. In addition, Japanese Unexamined Patent Publication No. 2002-287174 proposes to mix a fluorescent material in the charged particles.

However, when a fluorescent material or a luminous material is added to the charged particles or the insulating liquid, there arise many restrictions on process and material selection, in consideration of, for example, control of the content and distribution of the fluorescent material or luminous material in the charged particles, electrochemical stability with a charge controlling agent or a coloring agent, solubility to the insulating liquid and the like.

Then, the present invention intends to solve the problems mentioned above, and aims at providing an electrophoretic display device of reflective type, and which has relatively fewer restrictions on production process, and enables visual recognition of information even when there is almost no surrounding light, as well as the enhanced reflectance.

SUMMARY OF THE INVENTION

The present invention was made in consideration of the above-mentioned problems, and provides a display device that comprises charged particles located on a substrate and means of moving the charged particles parallel to the substrate, where the display states recognized from above the substrate is determined by the position of the charged particles on the substrate, characterized in that the substrate contains a fluorescent material or a luminous material. The fluorescent material or luminous material has such properties that it absorbs invisible light and is excited to emit visible light. It is excited by light outside the visible region (invisible light) when the substrate face is not covered by the charged particles, and emits visible light to the display side.

According to the present invention, not only visible light is reflected by the colored layer, but also invisible light is utilized effectively in a luminescent part to substantial reflectance.

In addition, when a luminous material is used, it stores light when there is external light (sunlight or artificial illumination), and when there is no external light, it emits stored light. Therefore, it is possible to see a display image even in a very dark place where is no outside light. The light emission period varies depending to the luminous material, but emission of up to several hours is possible.

DESCRIPTION OF THE PREFERRED EMBODIMENTS

Hereinafter, embodiments of the present invention will be explained with reference to FIGS. 1 to 4.

Figure 1:
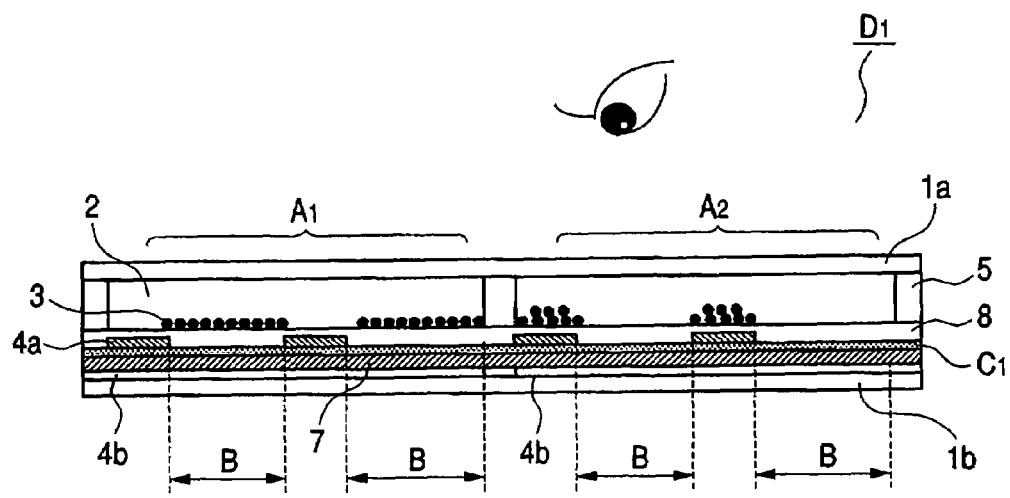
FIG. 1 is a sectional view showing an example structure of the electrophoretic display device according to the present invention.

An electrophoretic display device according to the present invention, as shown by reference numeral D1 in FIG. 1, comprises a display-side (front) substrate 1*a* and a rear substrate 1*b* positioned with a predetermined space, an insulating liquid 2 and a plurality of charged particles 3 which are located in the space of these substrates 1*a* and 1*b*, and a pair of electrodes 4*a* and 4*b* located near the insulating liquid 2, and the device displays an image by moving the charged particles 3 parallel to the substrates 1*a* and 1*b* applying a voltage to these electrodes 4*a* and 4*b*. The display is structured so as to enable visual recognition with the light entered from the front substrate 1a and reflected.

In addition, it is also acceptable to provide a partition member 5 in the space between the substrates 1a and 1b to partition pixels A1 and A2. The partition member 5 shown in FIG. 1 is a tabular member located along the normal line of the substrates 1a and 1b but not limited thereto. It may be a microcapsule-like shape, that is, a shell-like shape located not only in the normal line direction of the substrates 1a and 1b but also along faces of the substrates 1a and 1b. In the former case, the insulating liquid 2 and charged particles 3 are enclosed by the partition member 5 and substrates 1a and 1b. In the latter case, the insulating liquid 2 and charged particles 3 are encapsulated by the partition member alone.

The fluorescent material or the luminous material used in the present invention emits visible light on excitation with invisible light such as ultraviolet light, and the light emission continues as afterglow after the excitation light went out. Although the attenuation time of the afterglow varies with the materials, the present invention uses a material continuing the afterglow for a long time in such intensity that the afterglow is visually recognized.

The electrophoretic display device according to the present invention comprises luminescent parts C1 and C2 having at least a fluorescent or luminous material. The luminescent member C1 is disposed on one electrode (4b in FIG. 1), and partly covered by another electrode (4a in FIG. 1). The electrode on the luminescent part is opaque, and does not pass the light entering from above the substrate to the luminescent part, and does not pass the light emitted from the luminescent part.

An area B where the luminescent member C1 is exposed is formed on the electrode. When not covered by the charged particles, this area B absorbs invisible light, and the fluorescent material or luminous material is excited to emit visible light. When covered by the charged particles, the luminous member appears dark since the charged particles absorb at least the light emitted from the fluorescent or luminous material.

The charged particles may absorb the light in an excitation wavelength range or may transmit the light. When the particles transmit the excitation light, the luminous material stores the light even when covered with the charged particles. Accordingly, after that, when the display image changes and this covered area is exposed, the luminous material in this area emits light in the almost same brightness as the other areas that were not covered by charged particles.

A colored layer 7, of which color is different from that of the charged particles 3, is located in the area B, and reflects visible light. In FIG. 1, although the colored layer 7 is located all over the substrate 1b, it may be located only in the area B where the electrode 4b is disposed but not electrode 4a. In addition, in FIG. 1, the colored layer 7 is provided as a layer different from the electrode 4b or the luminescent member C1, but it is not limited thereto. The electrode 4b or the luminescent member C1 may be colored to be a colored layer.

In this embodiment, when the charged particles 3 are attracted by the electrodes 4b, 14b and 24a (a state designated by reference numeral A1 in FIGS. 1 to 4), the color of the charged particles 3 is recognized visually, and when the charged particles 3 are attracted by the other electrodes 4a, 14a and 24b, the color of the above-mentioned colored layer 7 is recognized visually (a state designated by reference numeral A2 in FIGS. 1 to 4). In such a condition, the luminescent member C1 or C2 absorbs invisible light, and emits visible light.

In order to obtain clear-cut color difference between a state where the charged particles 3 are attracted by the electrode 4b, 14b or 24a and a state where the particles are attracted by the other electrode 4a, 14a or 24b for improved display contrast, it is necessary that luminescence from the luminescent member C1 or C2 is not recognized visually when the color of the charged particles 3 is recognized visually. Then, it is preferable that the charged particles 3 include:

(1) a material that absorbs photo-energy that can excite the above-mentioned fluorescent material or luminous material, or (2) a material that absorbs light in the emission spectrum of the above-mentioned fluorescent material or luminous material.

Figure 2:
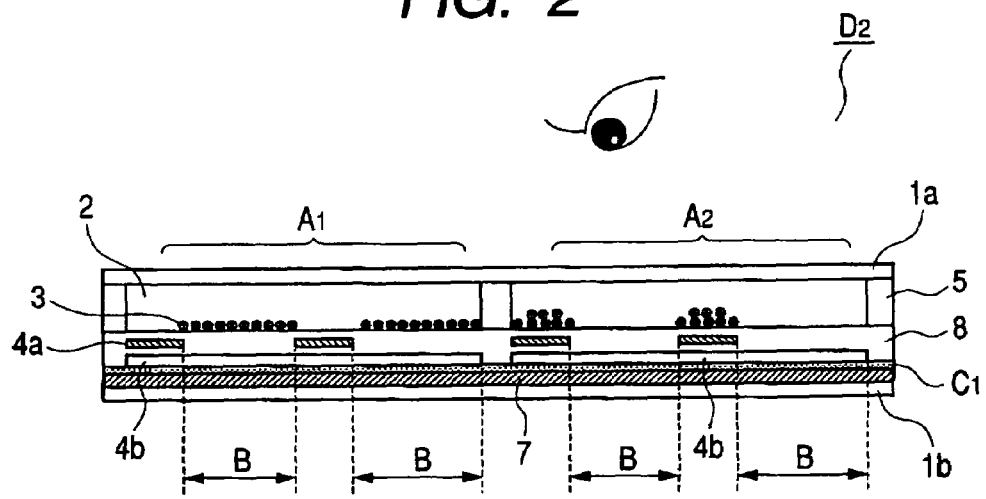
FIG. 2 is a sectional view showing another example structure of the electrophoretic display device according to the present invention.
Figure 3:
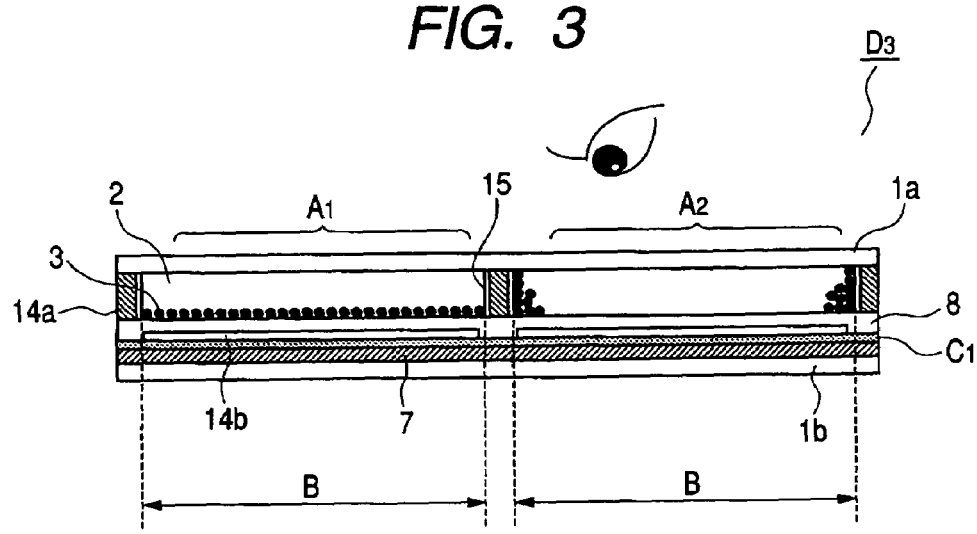
FIG. 3 is a sectional view showing still another example structure of the electrophoretic display device according to the present invention.
Figure 4:
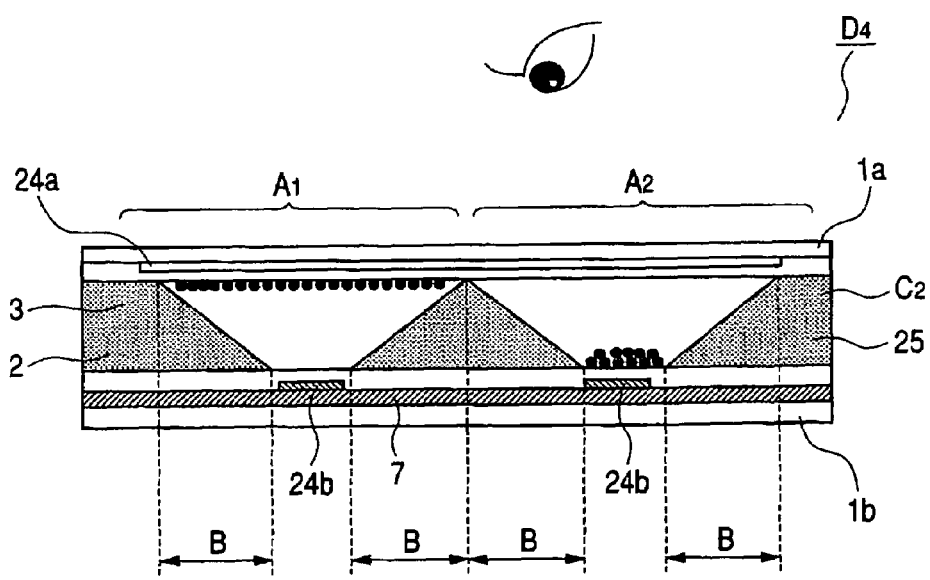
FIG. 4 is a sectional view showing a further example structure of the electrophoretic display device according to the present invention.

Here, the above luminescent member may be:

(1) disposed on the above-mentioned rear substrate 1b as shown by reference numeral C1 in FIGS. 1 to 3, or (2) the partition member 25 serving as the luminescent member, as shown by reference numeral C2 in FIG. 4.

Here, embodiments of the above (1) are as follows:

(1-1) a fluorescent material etc. is laminated on the electrode;

(1-2) the colored layer located along the electrode contains a fluorescent material etc.; and (1-3) the insulating layer located along the electrode 4b contains a fluorescent material etc.

Here, electrodes 4a and 4b may be disposed along the rear substrate 1b, and the layer including the fluorescent material etc. may be disposed between these electrodes, as shown by the reference numeral C1 in FIG. 1; or as shown in FIGS. 2 and 3, a pair of electrodes 4a and 4b (or 14a and 14b) may be disposed between the luminescent member C1 and the front substrate 1a.

FIG. 4 is a diagram showing an embodiment where the partition member 25 contains a fluorescent material etc. As shown by the reference numeral A1, when the charged particles 3 are attracted by the electrode 24a, they conceal the partition member 25 that also serves as the luminescent member C1. As shown by reference numeral A2, when the charged particles 3 are attracted by the electrode 24b, the partition member 25 is revealed for visual recognition. In particular, when the partition member has a large area or volume like the structure in FIG. 4, it is effective for the partition member contains a fluorescent material and/or a luminous material, whereby separate formation of a thick luminescent member can be omitted to simplify process.

One feature of the present invention is the high degree of freedom at the process development and material selection. If a fluorescent material or a luminous material is contained in charged particles or an insulating liquid, as with the prior arts, there are many restrictions on the process and material selection, such as the content and distribution of the fluorescent or luminous material in the charged particles, electrochemical stability of the fluorescent or luminous material with the charge controlling agent or the coloring agent, and solubility of the fluorescent or luminous material in the insulating liquid. According to the present invention, for example, in order to avoid the deterioration of a fluorescent or luminous material by heat treatment during production process, it is possible to provide a layer containing the fluorescent or luminous material on the back face of the rear substrate after the heat processing. In this case, a transparent material is preferably used for the substrates and electrodes.

The fluorescent material or the luminous material in the present invention is not limited specifically. For example, the fluorescent material may be an inorganic fluorescent substance, an organic fluorescent substance, or a combination thereof. As specific examples of the fluorescent substance, ZnO:Zn, ZnS:Cl, ZnS:Cu, Al, (Zn, Cd)S:Ag, Cl, $SnO_2$:Eu, $Y_2O_2S$:Eu, $ZuGa_2O_4$, etc. are cited. Still more detailed fluorescent materials are mentioned in Phosphor Research Society (edited), "fluorescent substance handbook" Ohm-sha, Ltd. (1987) etc. As specific examples of the luminous material, there are ZnS:Cu, CaS:Bi, (Ca, Sr)S:Bi, (Ca, Sr)S:Ce, SrS:Eu, $SrAl_2O_4$:Eu, $CaAl_2O_4$:Eu, $SrAl_2O_4$: Eu, Dy, etc. are cited. In the present invention, these fluorescent materials and luminous materials can be used independent or in combination.

Although the electrodes 4a and 4b are all supported by the rear substrate 1b in the electrophoretic display device shown in FIG. 1, the following structures are also preferred:

one electrode 14b is disposed on the rear substrate 1b and another electrode 14a is disposed inside the partition member 15, as shown in FIG. 3; and one electrode 24a is disposed on the front substrate 1a and another electrode 24b is disposed on the rear substrate 1b, as shown in FIG. 4.

In the electrophoretic display device shown in FIGS. 1 and 3, the charged particles 3 migrate laterally within the substrate region, i.e., they migrate along the substrate 1b between the electrodes 4a and 4b (or 14a and 14b).

In the electrophoretic display device shown in FIG. 4, the charged particles 3 migrate not only laterally but also in the normal line direction of the substrates 1a and 1b. Also in this case, however, the covered state and the exposed state of the light-emitting surface are switched by the lateral migration of the charged particles. Thus it is possible to apply the present invention as in FIGS. 1 and 3.

As mentioned above, the present invention can be applied to displays of any electrode arrangement, so long as the insulating liquid 2 is transparent, the charged particles 3 are colored, the color of the charged particles 3 is recognized visually (see reference numeral A1 in FIG. 1) when the charged particles 3 are distributed in a large area, the color of the colored layer 7 is recognized visually (see reference numeral A2 in FIG. 1) when the charged particles 3 gather in a narrow area, and an image is displayed based on the color difference between the charged particles and the colored layer.

Next, effects of this embodiment will be explained.

According to this embodiment, not only the visible light is reflected by the colored layer 7, but also the invisible light is effectively used by the luminescent member C1 or C2 to enhance the substantial reflectance.

In addition, when a luminous material is used, the device stores light when there is external light such as sunlight and artificial illumination, and when there is no external light, it emits stored light. Therefore, it is possible to see a display image even in a dark place where is no external light. The light emission period varies depending to the luminous material, but emission period up to several hours is possible.

Hereafter, the present invention is explained in further detail referring to Examples.

EXAMPLE 1

In this Example 1, a lateral migration type electrophoretic display device of the structure shown in FIG. 1 was produced. In this Example, the size of one pixel was set to 120 μm×120 μm, and a visual recognition area ratio (=A1−B:B) of electrodes 4a and 4b was set to 2:8.

As the rear substrate 1b, a stainless steel wheel substrate (260-μm thick) was used, an insulating layer (not shown) was formed on its surface, an aluminum film was formed on the insulating layer, and the electrode 4b was formed by photolithography or by wet etching. Then, a white colored layer (an acrylic resin where a white pigment such as titanium oxide or alumina is dispersed) 7 was formed to cover this electrode 4b.

Next, a blue fluorescent material of silver and aluminum-doped zinc sulfide (ZnS:Ag, Al) and a fine powdered luminous material consisting of $Al_2O_3$, CaO, SrO and $B_2O_3$ were dispersed in a resin binder, and this was applied on the colored layer (reference numeral C1).

A Ti metal layer was formed on a surface of the layer C1, and patterned to form an electrode 4a, and an acrylic resin layer (insulating layer) 8 was formed to cover the electrode 4a. Then, the partition 5 with the height of 20 μm and the width of 5 μm was formed on the surface of the resin layer 8.

Next, the insulating liquid 2 and the charged particles 3 were filled in cells partitioned by the partition 5. Isoparaffin (trade name: Isopar, product made by Exxon Corp.) was used as the insulating liquid 2, and a polystyrene polymethylmethacrylate copolymer resin containing carbon black with a particle diameter of about 2 μm was used for the charged particles 3. Isoparaffin was made to contain succinimide (trade name: OLOA1200, product of Chevron Corp.) as a charge-controlling agent. Finally, the front substrate 1a was stuck on the partition 5.

Display properties of the electrophoretic display device produced as above were measured by setting the voltage of the electrode 4b to 0 V, and applying a voltage of ±25 V to another electrode 4a. As a result, the display properties were as good as a high reflectance of white display and good display contrast under various light conditions ranging from the outdoor sunlight to the indoor fluorescent lamp. Further, it was confirmed that luminescence from the luminous material provides good display contrast for sufficient display recognition even under conditions with little illumination, outdoor night or the indoor dark room.

EXAMPLE 2

In this Example 2, a lateral migration type electrophoretic display device of the structure shown in FIG. 2 was produced. In this Example 2, the size of one pixel was 120 μm×120 μm, and a visual recognition area ratio (=A1−B:B) of electrodes 4a and 4b was 2:8.

As the rear substrate 1b, a glass substrate (1.1 mm thick) was used, and the white colored layer 7 was formed to cover the entire surface of the layer 7. Then, a mixture of a luminous material and a resin binder was applied to a surface of the colored layer 7 to form the luminous layer (reference numeral C1). The mixture was composed of: a compound expressed by $MAl_2O_3$(M represents strontium) as a luminous material, europium as an activator, and dysprosium as an activator dispersed in a resin binder. An ITO film was formed on the layer C1, and the electrode 4b was formed by photolithography or by wet etching. Then, an acrylic resin (insulating layer) 8 was formed to cover the electrode 4b, and the electrode 4a was formed with Ti metal thereon, and acrylic resin (insulating layer) 8 was formed further. Then, the partition 5 with the height of 20 μm and the width of 5 μm was formed on a surface of the acrylic resin layer 8.

Next, the insulating liquid 2 and charged particles 3 were filled in the cells partitioned by the partition 5. Isoparaffin (trade name: Isopar, product of Exxon Corp.) was used as the insulating liquid 2, and a polystyrene polymethylmethacrylate copolymer resin containing carbon black having a particle diameter of about 2 μm was used for the charged particles 3. This time, materials such as a benzophenone-based organic compound which absorb ultraviolet light being an excitation light for a luminous material were mixed in the charged particles. Carbon black is black and absorbs most visible rays emitted by the luminous material.

The insulating liquid 2 was made to contain succinimide (trade name: OLOA1200, a product of Chevron Corp.) as a charge controlling agent. Finally, the front substrate 1a was stuck onto the partition 5.

The same effects were obtained when the electrophoretic display device produced in this manner was driven by the same method as that in Example 1.

EXAMPLE 3

In this Example 3, a lateral-migration type electrophoretic display device having the structure shown in FIG. 3 was produced. Pixel size was set at 98 μm×98 μm in this embodiment.

A glass substrate (1.1 mm thick) was used as the rear substrate 1b. Next, titanium oxide as a white pigment, silver and aluminum-doped zinc sulfide (ZnS:Ag, Al) as a blue fluorescent material, and a material as a luminous material which consisted of zinc sulfide with copper as an activator were dispersed in a resin binder, and this was applied on the glass substrate. Then, an ITO film was formed on its surface, and the electrode 14b was formed by photolithography method or a wet etching method. On a surface of the electrode 14b, an acrylic resin layer (insulating layer) 8 was formed.

Next, the electrode 14a was formed on the pixel boundaries by plating, of which surface was covered with an acrylic resin to form the partition 15 (insulating layer). In addition, the width of the partition 15 was set at 7 μm, and height was set at 17 μm.

Next, the insulating liquid 2 and charged particles 3 were filled in the cells partitioned by the partition 5. Isoparaffin (trade name: Isopar, product of Exxon Corp.) was used for the insulating liquid 2, and a polystyrene polymethyl-methacrylate copolymer resin containing carbon black with a particle diameter of about 2 μm was used for the charged particles 3. At this point, a material such as an anilide acetate-based organic compound was mixed into the charged particles, for absorbing UV light that excites the luminous material. To isoparaffin, succinimide (trade name: OLOA1200, product made by Chevron Corp.) was added as a charge-controlling agent. Finally, the front substrate 1a was stuck on the partition 5.

Display properties of the electrophoretic display device produced as above were measured by setting the voltage of the electrode 14b to 0 V and applying a voltage of ±10 V to another electrode 14a. As a result, the display properties were as good as a high reflectance of white display and good display contrast under various light conditions ranging from the outdoor sunlight to the indoor fluorescent lamp. Further, it was confirmed that luminescence from the luminous material provides good display contrast for sufficient display recognition even under conditions with little illumination, outdoor night or the indoor dark room.

What is claimed is:

1. A display device comprising:
   a first substrate disposed on a viewer side, a second substrate disposed at a predetermined spacing with the first substrate;
   a luminescent layer disposed on the second substrate;
   a first electrode disposed on the luminescent layer exposing at least a portion of the luminescent layer; and
   a second electrode disposed on the second substrate,
   wherein a plurality of charged particles mixed with insulating liquid are disposed in the predetermined spacing between the first and second substrates, and the charged particles are configured to move by changing a polarity of a voltage applied between the first and second electrodes thereby selectively covering a portion of the predetermined spacing, and
   wherein positions of the charged particles determines a plurality of display states recognized from above the first substrate.

2. The display device of claim 1, wherein an insulation layer is disposed on the first electrode layer as well as the at least a portion of the luminescent layer exposed by the first electrode layer thereby preventing these layers from direct contacting with the charged particles and insulating liquid.

* * * * *